United States Patent
Masuda

(10) Patent No.: US 6,841,618 B2
(45) Date of Patent: Jan. 11, 2005

(54) THERMOPLASTIC POLYMER COMPOSITION HAVING BARRIER PROPERTIES

(75) Inventor: Haruhisa Masuda, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 166 days.

(21) Appl. No.: 10/369,503

(22) Filed: Feb. 21, 2003

(65) Prior Publication Data

US 2003/0162897 A1 Aug. 28, 2003

(30) Foreign Application Priority Data

Feb. 22, 2002 (JP) ........................................ 2002-046970

(51) Int. Cl.⁷ .......................... C08L 51/00; C08L 53/00; C08L 53/02
(52) U.S. Cl. .............................. 525/57; 525/60; 525/71
(58) Field of Search ............................... 525/57, 60, 71

(56) References Cited

U.S. PATENT DOCUMENTS

| 4,628,072 A | 12/1986 | Shiraki et al. |
| 5,160,475 A | 11/1992 | Asano et al. |
| 5,844,047 A | 12/1998 | Abend |
| 6,079,465 A | 6/2000 | Takeyama et al. |

FOREIGN PATENT DOCUMENTS

JP 4-164947 6/1992

OTHER PUBLICATIONS

U.S. Appl. No. 10/369,503, filed Feb. 21, 2003, Masuda.
U.S. Appl. No. 10/728,991, filed Dec. 8, 2003, Masuda et al.

Primary Examiner—Jeffrey Mullis
(74) Attorney, Agent, or Firm—Oblon, Spivak, McClelland, Maier & Neustadt, P.C.

(57) ABSTRACT

The present invention provides a thermoplastic polymer composition which is obtained through dynamic vulcanization performed by mixing an ethylene-vinyl alcohol copolymer (I), a modified block copolymer (II) which comprises an aromatic vinyl polymer block and a conjugated diene polymer block and which has a functional group consisting of a carboxyl group and/or its derivative, and an amine crosslinking agent (III), wherein the ethylene-vinyl alcohol copolymer (I) has an ethylene content of from 10 to 60 mole % and has a melt flow rate of from 1 to 20 g/10 minutes, and the amount of the functional group consisting of a carboxyl group and/or its derivative which the modified block copolymer (II) has is from 2 to 20 groups per molecule. The thermoplastic polymer composition is excellent in both barrier properties to gases, organic liquids and the like and flexibility.

12 Claims, No Drawings

THERMOPLASTIC POLYMER COMPOSITION HAVING BARRIER PROPERTIES

BACKGROUND OF THE INVENTION

1. Field of the Invention

The present invention relates to a thermoplastic polymer composition comprising an ethylene-vinyl alcohol copolymer and a crosslinked modified block copolymer, a formed article comprising the polymer composition, and applications of the polymer composition. The thermoplastic polymer composition of the present invention is useful, for example, as sheets, films, packaging materials for beverage and foodstuffs, containers, and packings for containers since it is excellent in both barrier properties to gases, organic liquids and the like and flexibility.

2. Description of the Related Art

Ethylene-vinyl alcohol copolymer has high barrier properties to gases, organic liquids and the like, and does not generate harmful gases during their incineration as polyvinyliden chloride or polyvinyl chloride does. Therefore, it is used for various applications such as packaging materials for foodstuffs. However, since ethylene-vinyl alcohol copolymer is poor in flexibility, it is known that it is used in the form of composition with soft resins such as polyolefin (see Japanese Patent Laid-Open No. 04-164947), or laminates.

Ethylene-vinyl alcohol copolymer usually exhibits a poor affinity and a poor compatibility with other resins. Therefore, it usually is not possible for composition obtained by blending a soft resin to an ethylene-vinyl alcohol copolymer to have a sufficient flexibility and sufficient barrier properties simultaneously. In addition, a laminate including a layer of an ethylene-vinyl alcohol copolymer and a layer of a soft resin has an improved flexibility in comparison with a layer of the ethylene-vinyl alcohol itself, but the flexibility of the laminate may still be insufficient for some applications.

SUMMARY OF THE INVENTION

An object of the present invention is to provide a thermoplastic polymer composition excellent in both barrier properties and flexibility, by using high levels of barrier properties to gases, organic liquids and the like which are merits of ethylene-vinyl alcohol copolymer, and by improving a short flexibility which is a drawback of the copolymers.

After diligent investigations, the present inventors found that when dynamic vulcanization is performed by mixing, under melting conditions, a specific ethylene-vinyl alcohol copolymer, a specific modified block copolymer and an amine crosslinking agent, a thermoplastic polymer composition can be obtained which contains a crosslinked modified block copolymer dispersed in the ethylene-vinyl alcohol copolymer and which can have both sufficient barrier properties and a sufficient flexibility simultaneously.

Namely, an aspect of the present invention is a thermoplastic polymer composition, (1) which is obtained through dynamic vulcanization performed by mixing 100 parts by weight of an ethylene-vinyl alcohol copolymer (I), from 5 to 900 parts by weight of a modified block copolymer (II) which comprises an aromatic vinyl polymer block and a conjugated diene polymer block and which has a functional group consisting of a carboxyl group and/or its derivative, and from 0.1 to 5 parts by weight, based on 100 parts by weight of the modified block copolymer (II), of an amine crosslinking agent (III), wherein (2) the ethylene-vinyl alcohol copolymer (I) has an ethylene content of from 10 to 60 mole % and has a melt flow rate of from 1 to 20 g/10 minutes, and (3) the amount of the functional group consisting of a carboxyl group and/or its derivative which the modified block copolymer (II) has is from 2 to 20 groups per molecule.

Another aspect of the present invention is a thermoplastic polymer composition comprising an ethylene-vinyl alcohol copolymer (I) and a modified block copolymer (II) which comprises an aromatic vinyl polymer block and a conjugated diene polymer block and which has a functional group consisting of a carboxyl group and/or its derivative, wherein the ethylene-vinyl alcohol copolymer (I) has an ethylene content of from 10 to 60 mole % and a melt flow rate of from 1 to 20 g/10 minutes, and wherein particles of the modified block copolymer (II) crosslinked with the amine crosslinking agent (III) are dispersed in a matrix comprising the ethylene-vinyl alcohol copolymer (I).

A preferable embodiment of the present invention is a formed article, particularly sheet or film, comprising one of the above-mentioned thermoplastic polymer compositions. Other preferable embodiments of the present invention include a laminate structure having a layer comprising one of the above-mentioned thermoplastic polymer compositions and a layer comprising other materials, and a packaging material for beverage and foodstuffs, a container, and a packing for a container which has at least one layer comprising one of the above-mentioned thermoplastic polymer compositions.

DESCRIPTION OF THE PREFERRED EMBODIMENTS

Hereinafter, embodiments of the present invention will be described in detail.

An ethylene-vinyl alcohol copolymer (I) in the present invention is a copolymer mainly composed of ethylene units and vinyl alcohol units. The ethylene-vinyl alcohol copolymer used in the present invention is not particularly limited thereto, and well known copolymers such as those used for molding applications may be used. However, the ethylene content of the ethylene-vinyl alcohol copolymer must be from 10 to 60 mole %, preferably from 20 to 50 mole %, more preferably from 25 to 40 mol % from viewpoints of the level of barrier properties to gases, organic liquids and the like and the level of formability. The ethylene-vinyl alcohol copolymer is, as described later, typified by saponified products of ethylene-fatty acid vinyl ester copolymers. In the case of saponified product of ethylene-fatty acid vinyl ester copolymers, the degree of saponification of fatty acid vinyl ester units is preferably 50 mole % or more, more preferably 90 mole % or more, still more preferably 95 mole % or more, and especially preferably 98 mole % or more from the viewpoints of the levels of barrier properties and thermal stability of ethylene-vinyl alcohol copolymers to be obtained. The melt flow rate (measured by a method described in ASTM D1238 under conditions: a temperature of 190° C. and a load of 2.16 kg) of the ethylene-vinyl alcohol copolymer must be from 1 to 20 g/10 minutes, preferably from 5 to 18 g/10 minutes from the viewpoint of the level of barrier properties to gases, organic liquids and the like and the level of formability of thermoplastic polymer compositions to be obtained.

The ethylene-vinyl alcohol copolymer may contain a small amount, preferably not more than 10 mole % based on the whole constituting units, of other constituting units in addition to ethylene units and vinyl alcohol units. Examples of the other constituting units include units derived from α-olefins, such as propylene, isobutylene, 4-methylpentene- 1,1-hexene and 1-octene; vinyl esters of carboxylic acids, such as vinyl ester of acetic acid, vinyl ester of propionic acid, vinyl ester of versatic acid, vinyl ester of pivalic acid, vinyl ester of valeric acid, vinyl ester of capric acid and vinyl ester of benzoic acid; unsaturated carboxylic acids or their derivatives (e.g., salts, esters, nitrites, amides and anhydrides) such as itaconic acid, methacrylic acid, acrylic acid and maleic anhydride; vinylsilane compounds such as vinyltrimethoxysilane; unsaturated sulfonic acids or their salts; and N-methylpyrrolidone. The ethylene-vinyl alcohol copolymer may have a functional group such as an alkylthio group at its terminal.

The method for producing the ethylene-vinyl alcohol copolymer is not particularly limited. The ethylene-vinyl alcohol copolymer can be produced by producing an ethylene-fatty acid vinyl ester copolymer and then saponifying it according to conventional methods. The ethylene-fatty acid vinyl ester copolymer is obtained, for example, by polymerizing monomers mainly composed of ethylene and fatty acid vinyl ester in an organic solvent such as methanol, t-butyl alcohol and dimethyl sulfoxide, under pressure, using a radical polymerization initiator such as benzoyl peroxide and azobisisobutyronitrile. As the fatty acid vinyl ester, vinyl ester of acetic acid, vinyl ester of propionic acid, vinyl ester of versatic acid, vinyl ester of pivalic acid, vinyl ester of valeric acid, vinyl ester of capric acid, and the like can be used. Of them, vinyl ester of acetic acid is preferred. For the saponification of the ethylene-fatty acid vinyl ester copolymer, acid catalysts or alkaline catalysts can be used.

The modified block copolymer (II) to be used in the thermoplastic polymer composition of the present invention is a modified block copolymer which is mainly composed of an aromatic vinyl polymer block and a conjugated diene polymer block and which has a functional group consisting of a carboxyl group and/or its derivative.

Examples of the aromatic vinyl monomer to be used for formation of the aromatic vinyl polymer block which constitutes the modified block copolymer (II) include aromatic vinyl compounds such as styrene, α-methylstyrene, β-methylstyrene, o-, m-, p-methylstyrenes, tert-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene, vinylanthracene, indene and acetonaphthylene. The aromatic vinyl polymer block may have a structural unit including only one kind of compound or two or more kinds of compounds selected from the above-mentioned aromatic vinyl compounds. In particular, it is preferable that the aromatic vinyl polymer block mainly includes structural units derived from styrene.

The aromatic vinyl polymer block may optionally contain a small amount of structural units including other copolymerizable monomers in addition to the structural units including aromatic vinyl compounds, and, in such cases, the ratio of the structural units including other copolymerizable monomers is preferably 30% by weight or less, and, more preferably, 10% by weight or less based on the weight of the aromatic vinyl polymer block.

In such cases, examples of the units including other copolymerizable monomers include units of a monomer such as 1-butene, pentene, hexene, butadiene, isoprene and methylvinyl ether.

The conjugated diene compound to be used for the formation of the conjugated diene polymer block in the modified block copolymer (II) mainly composed of an aromatic vinyl polymer block and a conjugated diene polymer block is exemplified by isoprene, butadiene, hexadiene, 2,3-dimethyl-1,3-butadiene, and 1,3-pentadiene. The conjugated diene polymer block may be constituted of one kind of conjugated diene compound or, alternatively, two or more kinds of them. When the conjugated diene polymer block has structural units derived from two or more kinds of conjugated diene compounds, the bonding mode thereof may be any of a random mode, a tapered mode, a partially block mode or a combination of two or more of these modes.

Among them, the conjugated diene polymer block is preferably: a polyisoprene block having monomer units mainly composed of isoprene units or a hydrogenated polyisoprene block obtained by hydrogenating a part or the whole of the unsaturated bonds in the polyisoprene block; a polybutadiene block having monomer units mainly composed of butadiene units or a hydrogenated polybutadiene block obtained by hydrogenating a part or the whole of the unsaturated bonds of the polybutadiene block; or an isoprene/butadiene copolymer block having monomer units mainly composed of isoprene units and butadiene units or a hydrogenated isoprene/butadiene copolymer block obtained by hydrogenating a part or the whole of the unsaturated bonds in the isoprene/butadiene copolymer block.

In the above-mentioned polyisoprene block which can be the constitutional block of the conjugated diene polymer block, the units derived from isoprene include, before hydrogenation, at least one kind of group selected from the group consisting of a 2-methyl-2-butene-1,4-diyl group [—$CH_2$—C($CH_3$)=CH—$CH_2$—; 1,4-bonded isoprene unit], an isopropenylethylene group [—CH(C($CH_3$)=$CH_2$)—$CH_2$—; 3,4-bonded isoprene unit], and a 1-methyl-1-vinylethylene group [—C($CH_3$) (CH=$CH_2$)—$CH_2$—; 1,2-bonded isoprene unit]. The proportion of each unit is not particularly limited.

In the polybutadiene block which can be a constitutional block of the conjugated polymer block, it is preferable that, before hydrogenation, the butadiene units include from 70 to 20 mole %, particularly from 65 to 40 mole % of 2-butene-1,4-diyl groups (—$CH_2$—CH=CH—$CH_2$—; 1,4-bonded butadiene unit) and from 30 to 80 mole %, particularly, from 35 to 60 mole % of vinylethylene groups [—CH(CH=$CH_2$)—$CH_2$—; 1,2-bonded butadiene unit].

In the isoprene/butadiene copolymer block which can be the constitutional block of the conjugated diene polymer block, the units derived from isoprene include, before hydrogenation, at least one kind of group selected from the group consisting of a 2-methyl-2-butene-1,4-diyl group, an isopropenylethylene group and a 1-methyl-1-vinylethylene group and the units derived from butadiene include a 2-butene-1,4-diyl group and/or a vinylethylene group. The proportion of each unit is not particularly restricted. In the isoprene/butadiene copolymer block, the arrangement of the isoprene units and the butadiene units may be any of a random mode, a block mode or a tapered block mode. The molar ratio of the isoprene units to the butadiene units is preferably from 1:9 to 9:1, more preferably, from 3:7 to 7:3.

In the modified block copolymer (II) mainly composed of an aromatic vinyl polymer block and a conjugated diene polymer block, it is preferable that a part or the whole of the unsaturated double bonds in the conjugated diene polymer block is preferably hydrogenated from the viewpoint of achieving excellent heat resistance and weather resistance of the thermoplastic polymer composition. In this case, the hydrogenation rate of the conjugated diene polymer block is preferably 50 mole % or more, more preferably 60 mole % or more and further preferably 80 mole % or more.

In the modified block copolymer (II), the molecular weights of the aromatic vinyl polymer block and the conjugated diene polymer block are not particularly limited. However, in a state before hydrogenation, the number average molecular weight of the aromatic vinyl polymer block preferably ranges from 2,500 to 75,000 and the number average molecular weight of the conjugated diene polymer block preferably ranges from 10,000 to 150,000, from the viewpoints of mechanical characteristics and formability of the thermoplastic polymer composition. It is noted that the number average molecular weight of a block copolymer referred to in this specification indicates a value obtained from a standard polystyrene calibration curve obtained by gel permeation chromatography (GPC).

In addition, the modified block copolymer (II) is preferably a triblock copolymer including two aromatic vinyl polymer blocks and one conjugated diene polymer block from the viewpoint that a resulting thermoplastic polymer composition becomes excellent in flexibility and mechanical characteristics.

Although not particularly limited, the modified block copolymer (II) can be produced by ion polymerization such as anion polymerization and cation polymerization, single site polymerization, radical polymerization, and the like.

In the case of anion polymerization, the modified block copolymer (II) can be manufactured by polymerizing an aromatic vinyl compound and a conjugated diene compound sequentially using an alkyllithium compound or the like as a polymerization initiator in an inert organic solvent such as n-hexane and cyclohexane to obtain a diblock or triblock copolymer having a desired molecular structure and a desired molecular weight, and then stopping the polymerization by addition of an active hydrogen compound such as alcohol, carboxylic acid, water and the like.

The functional group consisting of a carboxyl group and/or its derivative which the modified block copolymer (II) has is exemplified by a carboxyl group, groups having a structure of dicarboxylic anhydride (e.g., a maleic anhydride group), amide groups (e.g., a carbamoyl group, an alkylcarbamoyl group and an acylamino group), and ester groups (e.g., a carboxylic acid hydroxyalkyl ester group and a carboxylic acid glycidyl ester group).

As the method for introducing the above-mentioned functional group consisting of a carboxyl group and/or its derivative may be, but is not limited to, (1) a method in which an $\alpha,\beta$-unsaturated carboxylic acid and/or its derivative is radically added to a block copolymer composed of an aromatic vinyl polymer block and a conjugated polymer block under melting conditions; (2) a method in which a copolymerizable monomer having a functional group consisting of a carboxyl group and/or its derivative, a polymerization initiator, a chain transfer agent, a chain terminator, or the like are used together when monomers for forming a block polymer are polymerized; (3) a method in which a copolymerizable monomer which is capable of forming a functional group consisting of a carboxyl group and/or its derivative through a reaction such as elimination of a protective group and hydrolysis, a polymerization initiator, a chain transfer agent, a chain transfer terminator, or the like are used together when monomers for forming a block polymer are polymerized and, after the polymerization, a reaction for forming the functional group is performed; (4) a method that uses a macromolecular reaction in which an oxidizing agent or the like is allowed to react with a block copolymer free of functional groups to introduce a functional group; and the like. Examples of the $\alpha,\beta$-unsaturated carboxylic acid and/or its derivative in method (1) and examples of the copolymerizable monomer having a functional group consisting of a carboxyl group and/or its derivative in method (2) of the above-mentioned methods for introducing functional groups include $\alpha,\beta$-unsaturated monocarboxylic acids such as acrylic acid and methacrylic acid; $\alpha,\beta$-unsaturated dicarboxylic acids such as maleic acid, succunic acid, itaconic acid and phthalic acid; $\alpha,\beta$-unsaturated monocarboxylic acid esters such as glycidyl acrylate, glycidyl methacrylate, hydroxyethyl acrylate and hydroxyethyl methacrylate; $\alpha,\beta$-unsaturated dicarboxylic anhydrides such as maleic anhydride, succinic anhydride, itaconic anhydride and phthalic anhydride. Of these, $\alpha,\beta$-unsaturated dicarboxylic anhydrides such as maleic anhydride, succinic anhydride, itaconic anhydride and phthalic anhydride are particularly preferred. In particular, maleic anhydride is preferable.

The amount of the functional group consisting of a carboxyl group and/or its derivative which the modified block copolymer (II) has must be within the range of from 2 to 20 groups per molecule of the modified block copolymer (II), and is preferably within the range of from 6 to 18 groups, more preferably within the range of from 7 to 15 groups. The amount of the functional group can be calculated from the amount of the functional group per unit weight determined by titration or NMR spectrum measurement and the number average molecular weight of the modified block copolymer (II). When the functional group which the modified block copolymer (II) has is a group being capable of forming a plurality of carboxyl groups through a hydrolysis reaction, such as groups having a structure of dicarboxylic anhydride, the amount of the functional group referred to in the present invention shall mean the number determined from the chemical structure before hydrolysis.

The amine crosslinking agent (III) to be used in the present invention is an amine compound with two or more functionalities which is capable of reacting with the functional group consisting of a carboxyl group and/or its derivative which the modified block copolymer (II) has. The amine crosslinking agent (III) is not particularly restricted so long as it is a compound having two or more nitrogen atoms having at least one active hydrogen. Examples thereof include alkyldiamines such as 1,4-butanediamine, 1,9-nonanediamine, 2-methyl-1,8-octanediamine and 1,4-diaminocyclohexane; aminocarbamic acids, such as hexamethylene di aminecarbamic acid and 4,4'-methylenebis(cyclohexylamine)carbamic acid, and/or their salts. Of these, preferred is use of aminocarbamic acids and/or their salts from the viewpoint that a thermoplastic polymer composition particularly excellent in barrier properties to gases or the like can be obtained.

The incorporation proportions of the above-mentioned components (I) to (III) in the thermoplastic polymer composition of the present invention are 100 parts by weight of the ethylene-vinyl alcohol copolymer (I), from 5 to 900 parts by weight, preferably from 40 to 800 parts by weight, based on 100 parts by weight of component (I), of the modified block copolymer (II), and from 0.1 to 5 parts by weight, preferably from 0.2 to 3 parts by weight, based on 100 parts by weight of component (II), of the amine crosslinking agent (III).

If the amount of the modified block copolymer (II) incorporated is less than 5 parts by weight based on 100 parts by weight of the ethylene-vinyl alcohol copolymer (I), the resulting thermoplastic polymer compositions will be poor in flexibility; whereas if over 900 parts by weight, the thermoplastic polymer compositions will be poor in gas barrier property.

If the amount of the amine crosslinking agent (III) incorporated is less than 0.1 part by weight based on 100 parts by weight of the modified block copolymer (II), the resulting thermoplastic polymer compositions will be poor in gas barrier property; whereas if over 5 parts by weight, the formed articles comprising the compositions will have poor surface appearances.

The thermoplastic polymer composition of the present invention is obtained by subjecting the above-mentioned components (I) to (III) to dynamic vulcanization by mixing them under melting conditions. This step includes melt kneading the ethylene-vinyl alcohol copolymer (I) and the modified block copolymer (II) to disperse them finely and uniformly and further forming crosslinking bonds, with the amine crosslinking agent (III), between functional groups which the modified block copolymer (II) has.

For melt kneading, any machine can be used so long as it is a melt kneading machine capable of mixing individual components homogeneously. Examples of such a melt kneading machine include single screw extruders, twin screw extruders, kneaders and a Banbury mixer. In particular, preferred is use of a twin screw extruder which can exhibit a great shearing force during kneading and can be operated continuously.

The thermoplastic polymer composition of the present invention can be produced through, for example, the following processing steps. Specifically, an ethylene-vinyl alcohol copolymer (I) and a modified block copolymer (II) are mixed and fed into a hopper of an extruder. A part of the ethylene-vinyl alcohol copolymer (I) may be added at a middle portion of the extruder. An amine crosslinking agent (III) may be added first together with the ethylene-vinyl alcohol copolymer (I) and the modified block copolymer (II), or alternatively may be added at a middle portion of the extruder. Moreover, another possible option is to perform the melt kneading stepwise by use of two or more extruders.

The melt kneading temperature is preferably from about 160° C. to about 280° C., more preferably from 200° C. to 240° C. The melt kneading time is preferably from about 30 seconds to about 5 minutes.

The thermoplastic polymer composition obtained in the way mentioned above has a structure where the modified block copolymer (II) crosslinked with the amine crosslinking agent (III) is dispersed in a matrix comprising the ethylene-vinyl alcohol copolymer (I). The dispersed particles of the crosslinked modified block copolymer preferably has a diameter of from 0.1 to 30 $\mu$m, more preferably from 0.2 to 20 $\mu$m.

It is also possible to allow the thermoplastic polymer composition of the present invention to contain a paraffin oil in order to further improve the flexibility. In general, oils employed as a process oil and the like are products obtained by mixing components having an aromatic ring such as a benzene ring and a naphthene ring, paraffin components (chain hydrocarbons), and the like. Those in which the number of the carbons constituting paraffin chains accounts for the number of the carbon atoms of the whole oil is 50% or more are called "paraffin oil". The paraffin oil to be used in the thermoplastic polymer composition of the present invention may be any oil called paraffin oil. However, those containing not more than 5% by weight of components having an aromatic ring are preferably used.

The amount of the paraffin oil incorporated is preferably not more than 200 parts by weight based on 100 parts by weight of the modified block copolymer (II). The dynamic viscosity of the paraffin oil at 40° C. is preferably from $20\times10^{-6}$ to $800\times10^{-6}$ m$^2$/sec, more preferably from $50\times10^{-6}$ to $600\times10^{-6}$ m$^2$/sec. The pour point thereof is preferably from −40 to 0° C., more preferably from −30 to 0° C. Further, the flash point of the paraffin oil is preferably from 200 to 400° C., more preferably from 250 to 350° C. When the thermoplastic polymer composition is produced, the paraffin oil may be melt kneaded after being impregnated into the modified block copolymer (II), or may be added during melt kneading. Further, the impregnation and the addition during melt kneading may be used together.

The thermoplastic polymer composition of the present invention may, if necessary, contain other polymers in addition to the above-mentioned components unless the effect of the present invention is damaged substantially. Examples of other polymers which can be incorporated include resins such as polyethylene, polypropylene, polyamide, polyester, and the like.

Furthermore, the thermoplastic polymer composition of the present invention may, if necessary, contain inorganic fillers, dyestuffs, pigments and the like for the purposes of reinforcement, increasing in quantity, coloring, and the like. Examples of the inorganic fillers, dyestuffs and pigments include calcium carbonate, talc, clay, synthetic silicon, titanium oxide, carbon black and barium sulfate. The amounts of the inorganic filler, dyestuffs and pigments incorporated are preferably within a range such that the barrier properties of the thermoplastic polymer composition to gases, organic liquids and the like are not damaged. In general, they are preferably not more than 50 parts by weight based on 100 parts by weight of the total of the ethylene-vinyl alcohol copolymer (I) and the modified block copolymer (II).

The thermoplastic polymer composition of the present invention may, if necessary, contain one or more components in addition to the above-mentioned components, such as crosslinking aids, lubricants, light stabilizers, flame retardants, antistatic agents, silicone oil, antiblocking agents, ultraviolet absorbers, antioxidants, mold releasing agents, foaming agents and perfumes.

The thermoplastic polymer composition of the present invention can be used as a forming material after forming into an arbitrary form such as pellets, powder and the like. Moreover, the polymer composition of the present invention can be formed or molded using a conventional forming method and a forming device that are used for general thermoplastic polymers because it has thermoplasticity. As the forming method, arbitrary methods can be adopted such as injection molding, extrusion, compression molding, blow molding, calendering and vacuum forming. The formed article produced by such a method which comprises the polymer composition of the present invention include those of various forms such as a pipe, a sheet, a film, a disk, a ring, a bag, a bottle, a string, a fiber and the like. Moreover, a laminate structure or a composite structure comprising the polymer composition and other materials are included. The adoption of the laminate structure of the polymer composition and other materials permits formed articles to have characteristics the other materials have such as moisture resistance, mechanical characteristics and the like.

In formed articles having a laminate structure having at least one layer comprising the thermoplastic polymer composition of the present invention and at least one layer comprising other materials, appropriate materials may be selected as the other materials depending upon the characteristics required, the applications planned and the like. Examples of the other materials include thermoplastic resins such as polyolefin (e.g., high density polyethylene, middle density polyethylene, low density polyethylene, linear low density polyethylene, ethylene-propylene copolymers, polypropylene, and the like), ionomer, ethylene-vinyl acetate copolymer (EVA), ethylene-acrylic acid ester copolymer (EEA), polystyrene (PS), polyvinyl chloride (PVC), and polyvinylidene chloride (PVDC).

In formed articles having the laminate structure, an adhesive layer may be disposed between the layer of the thermoplastic polymer composition of the present invention and a substrate layer of other materials. When an adhesive layer is disposed, it can stick and integrate firmly the layer of the thermoplastic polymer composition and the substrate layer of other materials disposed on both sides of the adhesive layer. The adhesive to be used in the adhesive layer is exemplified by acid anhydride-modified products of diene polymers; acid anhydride-modified products of polyolefins; and mixtures of a macromolecular polyol (e.g., polyester-polyols obtained by polycondensation of a glycol compound such as ethylene glycol and propylene glycol and a dibasic acid such as adipic acid; a partially saponified product of a copolymer of vinyl acetate and vinyl chloride; and the like)

and polyisocyanate compound (e.g., reaction products of a glycol compound such as 1,6-hexamethyleneglycol and a diisocyanate compound such as 2,4-tolylenediisocyanate with a molar ratio of 1:2; reaction products of a triol compound such as trimethylolpropane and a diisocyanate compound such as 2,4-tolylenediisocyanate with a molar ratio of 1:3; and the like). For forming the laminate structure, it is possible to use conventional methods such as co-extrusion, co-injection, extrusion coating, and the like.

Since the formed article comprising the thermoplastic polymer composition of the present invention has both excellent barrier properties to many gases, organic liquids and the like and excellent flexibility, it can be used, for example, as articles for daily use, packaging materials and machine parts which are required to have those properties. Examples of applications where the characteristics of the polymer composition of the present invention can be exerted particularly effectively include packaging materials for beverage and foodstuffs, containers, packings for containers, and the like. In formed articles to be used in such applications, the polymer composition is only required to form at least one layer. The form of the polymer composition can appropriately be selected from those with a single layer structure comprising the polymer composition and those of a laminate structure having at least one layer of the polymer composition and at least one layer of other materials. The above-mentioned packaging materials for beverage and foodstuffs, containers, and packings for containers are excellent in ability of preserving contents for a long term because they can inhibit permeation of oxygen gas in the air and penetration of volatile components in the contents.

Formed articles comprising the polymer composition of the present invention can be reused by being melted at their disposal.

EXAMPLES

The present invention will be explained more specifically with reference to examples and the like, but the present invention is not limited at all to such examples. Using the pellets of the thermoplastic polymer compositions prepared in the examples and comparative examples shown below, formed articles (specimens) were manufactured according to the following ways. Physical properties of the specimens, namely, oxygen transmission rate, elastic modulus, 100% modulus, tensile strength at break, tensile elongation at break, and dispersed particle diameter of a modified block copolymer, were measured in the ways as described below.
(1) Measurement of Oxygen Transmission Rate:

The pellets of the thermoplastic polymer compositions manufactured in examples and comparative examples shown below were compression molded into 100 μm-thick sheet-like specimens under heating using a compression molding machine. Using the specimens, a measurement of oxygen transmission rate was conducted. The measurement of oxygen transmission rate was conducted using a gas transmission rate analyzer ("GTR-10" manufactured by Yanagimoto Co., Ltd. ) under conditions including an oxygen pressure of 0. 34 MPa, a temperature of 35° C. and a humidity of 0% RH.
(2) Measurement of Elastic Modulus:

The pellets of the thermoplastic polymer compositions manufactured in the examples and comparative examples shown below were compression molded into 1 mm-thick sheets under heating using a compression molding machine. From these sheets 5 mm-wide strap-like specimens were prepared, and the dynamic viscoelasticity was measured under tensile loading to determine the elastic modulus at room temperature. It is noted that the measurement of the dynamic viscoelasticity was performed at a frequency of 1 Hz using a viscoelasticity analyzer ("DVE-V4" manufactured by Rheology Co., Ltd.)

(3) Measurements of Tensile Strength at Break, Tensile Elongation at Break and 100% Modulus:

Dumbbell specimens 2 mm in thickness and 5 mm in width were prepared by molding the pellets of the thermoplastic polymer compositions manufactured in examples and comparative examples shown below under conditions including a cylinder temperature of 210° C. and a mold temperature of 40° C. using a 15-ton injection molding machine ("ROBOSHOT-α15" manufactured by FANUC Co., Ltd.) Using the dumbbell specimens obtained above, the tensile strength at break, the tensile elongation at break and the 100% modulus were measured at 500 mm/min in accordance with JIS K6301 with an AUTOGRAPH manufactured by Shimadzu Corporation.

(4) Measurement of Average Dispersed Particle Diameter of Modified Block Copolymer:

The average dispersed particle diameter was determined by electron staining of cut surfaces of the thermoplastic polymer compositions manufactured in examples and comparative examples shown below, followed by observation through a scanning electron microscope. In Table 2 below, the symbol "-" indicates that a modified block copolymer forms not a dispersed phase but a matrix phase or that a modified block copolymer having a single phase.

The particulars of the ethylene-vinyl alcohol copolymer (I), modified block copolymer (II) and amine crosslinking agent (III) used in examples and comparative examples shown below are as follows.

[Ethylene-Vinyl Alcohol Copolymer (I)]

Saponified ethylene-vinyl acetate copolymer (ethylene unit content=32 mole %, melt flow rate=14 g/10 minutes)

[Modified Block Copolymer (II)]

Maleic anhydride-modified triblock copolymer comprising polystyrene block-hydrogenated polybutadiene block-polystyrene block (styrene unit content=30% by weight, molecular weight=100,000, acid value=5 mg $CH_3ONa/g$, amount of maleic anhydride group=6.5 groups/molecule)

[Amine Crosslinking Agent (III)]

Hexamethylenediaminecarbamic acid

Examples 1 to 6

(1) Pellets of thermoplastic polymer compositions were prepared by preliminarily mixing the above-mentioned ethylene-vinyl alcohol copolymer (I), modified block copolymer (II) and amine crosslinking agent (III) each at the ratio shown in the following Table 1, followed by supplying the resulting mixture to a twin screw extruder ("ZSK-25WLE" manufactured by Krupp Werner & Pfleiderer), melt kneading at a cylinder temperature of 200° C. and a screw rotation speed of 350 rpm, extruding and cutting.

(2) Using the pellets of the thermoplastic polymer compositions prepared in (1) above, press films and molded articles (specimens) were produced in the methods mentioned above. Their oxygen transmission rates, elastic moduli at 20° C., tensile strenghts at break, tensile elongations at break and 100% moduli were measured in the methods described above. The results are shown in Table 1 below.

TABLE 1

|  | Example 1 | Example 2 | Example 3 | Example 4 | Example 5 | Example 6 |
| --- | --- | --- | --- | --- | --- | --- |
| Ethylene-vinyl alcohol copolymer (I) | 70 | 60 | 50 | 40 | 30 | 20 |
| Modified block copolymer (II) | 30 | 40 | 50 | 60 | 70 | 80 |
| Amine crosslinking agent (III) | 0.2 | 0.2 | 0.4 | 0.4 | 0.4 | 0.7 |
| Oxygen transmission rate (mL · 20 μm/m² · day · atm) | 1 | 2 | 5 | 13 | 90 | 160 |
| Elastic modulus (Pa) | $1.1 \times 10^9$ | $9.8 \times 10^8$ | $8.6 \times 10^8$ | $6.1 \times 10^8$ | $4.2 \times 10^8$ | $2.1 \times 10^8$ |
| 100% Modulus (MPa) | 24 | 22 | 15 | 14 | 14 | 13 |
| Tensile strength at break (MPa) | 30 | 26 | 16 | 16 | 16 | 16 |
| Tensile elongation at break (%) | 135 | 170 | 190 | 280 | 390 | 400 |
| Average dispersed particle diameter (μm) | 9 | 10 | 10 | 12 | 13 | 15 |

Comparative Example 1

(1) Pellets of thermoplastic polymer compositions were prepared by preliminarily mixing the above-mentioned ethylene-vinyl alcohol copolymer (I) and modified block copolymer (II) each at the ratio shown in the following Table 2, followed by supplying the resulting mixture to a twin screw extruder ("ZSK-25WLE" manufactured by Krupp Werner & Pfleiderer) without addition of an amine crosslinking agent (III), melt kneading at a cylinder temperature of 200° C. and a screw rotation speed of 350 rpm, extruding and cutting.

(2) Using the pellets of the thermoplastic polymer composition prepared in (1) above, a press film and a molded article (specimen) were produced in the methods described above. Its oxygen transmission rate, elastic modulus at 20° C., tensile strength at break, tensile elongation at break and 100% modulus were measured in the methods described above. The results are shown in Table 2 below.

Comparative Examples 2 and 3

(1) Using pellets of the ethylene-vinyl alcohol copolymer (I) or pellets of the modified block copolymer (II) alone, press films and molded articles (specimens) were produced in the methods described above.

(2) The oxygen transmission rates, elastic moduli at 20° C., tensile strength at break, tensile elongations at break and 100% moduli were measured in the methods described above. The results are shown in Table 2 below.

TABLE 2

|  | Comparative Example 1 | Comparative Example 2 | Comparative Example 3 |
| --- | --- | --- | --- |
| Ethylene-vinyl alcohol copolymer (I) | 30 | 100 |  |
| Modified block copolymer (II) | 70 |  | 100 |
| Oxygen transmission rate (mL · 20 μm/m² · day · atm) | 51000 | 0.5 | 110000 |
| Elastic modulus (Pa) | $3.6 \times 10^7$ | $2.0 \times 10^9$ | $8.6 \times 10^6$ |
| 100% Modulus (MPa) | 7 | — | 1.9 |
| Tensile strength at break (MPa) | 9 | 61 | 8.2 |
| Tensile elongation at break (%) | 220 | 16 | 520 |
| Average dispersed particle diameter (μm) | — | — | — |

The results shown in Table 1 indicate that when using the thermoplastic polymer compositions of Examples 1 to 6 prepared by use of the ethylene-vinyl alcohol copolymer (I), the modified block copolymer (II) and the amine crosslinking agent (III), high-quality molded articles can smoothly be obtained which are excellent in gas barrier property as indicated by the oxygen transmission rates of from about 1 to about 160 mL·20 μm/m²·day·atm (0.11 to 18 fm·20 μm/Pa·s) and are also excellent in various physical properties such as mechanical characteristics, flexibility and elasticity.

The results shown in Table 2 indicate that when the thermoplastic polymer composition of Comparative Example 1 which contains the ethylene-vinyl alcohol polymer (I) and the modified block copolymer (II) but is free of an amine crosslinking agent (II) is used, the products are poor in gas barrier property as indicated by the oxygen transmission rate of about 51000 mL·20 μm/m²·day·atm (5800 fm·20 μm/Pa·s) and are insufficient also in mechanical characteristics.

The thermoplastic polymer composition of the present invention is excellent in barrier properties to gases, organic liquids, and the like and is also excellent in flexibility. Therefore, it is used effectively for applications where those properties are required such as packaging materials for beverage and foodstuffs, containers, and packings for containers.

What is claimed is:

1. A thermoplastic polymer composition comprising an ethylene-vinyl alcohol copolymer (I) and a modified block copolymer (II) which comprises an aromatic vinyl polymer block and a conjugated diene polymer block and which has a functional group consisting of a carboxyl group and/or its derivative, wherein the ethylene-vinyl alcohol copolymer (I) has an ethylene content of from 10 to 60 mole % and a melt flow rate of from 1 to 20 g/10 minutes, and particles of the modifiedblock copolymer (II) crosslinked with the amine crosslinking agent (III) are dispersed in a matrix comprising the ethylene-vinyl alcohol copolymer (I).

2. A thermoplastic polymer composition which is obtained through dynamic vulcanization performed by mixing 100 parts by weight of an ethylene-vinyl alcohol copolymer (I), 5 to 900 parts by weight of a modified block copolymer (II) which comprises an aromatic vinyl polymer block and a conjugated diene polymer block and which has a functional group consisting of a carboxyl group and/or its derivative, and 0.1 to 5 parts by weight, based on 100 parts by weight of the modified block copolymer (II), of an amine crosslinking agent (III), wherein the ethylene-vinyl alcohol copolymer (I) has an ethylene content of from 10 to 60 mole % and has a melt flow rate of from 1 to 20 g/10 minutes, and the amount of the functional group consisting of a carboxyl group and/or its derivative which the modified block copolymer (II) has is from 2 to 20 groups per molecule.

3. The thermoplastic polymer composition according to claim 1, wherein the crosslinked modified block copolymer (II) is dispersed in a matrix comprising the ethylene-vinyl alcohol copolymer (I), with a particle diameter of from 0.1 to 30 µm.

4. The thermoplastic polymer composition according to claim 1, wherein the functional group which the modified block copolymer (II) has is a maleic anhydride group.

5. The thermoplastic polymer composition according to claim 1, wherein the modified block copolymer (II) is a modified triblock copolymer comprising two aromatic vinyl polymer blocks and one conjugated diene polymer block.

6. The thermoplastic polymer composition according to claim 1, wherein the amine crosslinking agent (III) is aminocarbamic acid and/or its salt.

7. A formed article comprising the thermoplastic polymer composition according to claim 1.

8. A sheet or film comprising the thermoplastic polymer composition according to claim 1.

9. A laminate structure having a layer comprising the thermoplastic polymer composition according to claim 1, and a layer comprising other material.

10. A packaging material for beverage or foodstuffs, having at least one layer comprising the thermoplastic polymer composition according to claim 1.

11. A container having at least one layer comprising the thermoplastic polymer composition according to claim 1.

12. A packing for a container, having at least one layer comprising the thermoplastic polymer composition according to claim 1.

* * * * *